C. J. A. FIESSE.
APPARATUS FOR SEPARATING MIXED GASES.
APPLICATION FILED SEPT. 18, 1907.

933,243.

Patented Sept. 7, 1909.
3 SHEETS—SHEET 2.

Witnesses
M. C. Lyddane
Edward R. Whitman

Inventor
Charles J. A. Fiesse
By Julian C. Dowell Mor.
his Atty

UNITED STATES PATENT OFFICE.

CHARLES J. A. FIESSE, OF WASHINGTON, DISTRICT OF COLUMBIA.

APPARATUS FOR SEPARATING MIXED GASES.

933,243. Specification of Letters Patent. Patented Sept. 7, 1909.

Application filed September 18, 1907. Serial No. 393,557.

*To all whom it may concern:*

Be it known that I, CHARLES J. A. FIESSE, a citizen of the United States, residing at Washington, in the District of Columbia, have invented certain new and useful Improvements in Apparatus for Separating Mixed Gases; and I do hereby declare the following to be a full, clear, and exact description of the invention, such as will enable others skilled in the art to which it appertains to make and use the same.

The broad object of this invention is to segregate or separate the constituent elements of any compound or gaseous mixture susceptible of treatment by the present apparatus, such, for instance, as water gas, when the CO has been converted, by suitable means, into $CO_2$ to insure the solubility of the $CO_2$ into water; or the combustion product issuing out of the cylinder of a gas engine, or of a furnace when it is desired to obtain the $CO_2$ for subsequent treatment; or blast furnace or producer gas, when it is desired to segregate or separate the nitrogen, or part of the nitrogen, in order to obtain either a gas richer in CO and poorer in N than the gas from which it is derived, or to obtain what I call "superoxygenated air," that is air richer in O and poorer in N than atmospheric air.

As a further object, my invention provides an improved apparatus or machine for collecting the gaseous mixture which is to be separated, and delivering it under pressure in puffs or pulsations. The main purpose of delivering the gas in puffs or pulsations is to cause its injection into a liquid, either water or water solution, or a suitable liquefied substance, as for instance hot lard, which dissolves four times as much nitrogen as water, in such manner as to form bubbles which will promote the effectual separation of the gaseous mixture.

As a further object, my invention provides an improved apparatus for blowing or delivering the gas under pressure and in puffs or pulsations, and also effecting when desired a partial segregation of the elements of the gas prior to delivery to the liquid in which the final separation of the gaseous mixture is to take place. In this apparatus, the puffing or pulsating of the gaseous mixture is utilized as a partial agent in the segregation of the constituent elements of mixed gas.

As a further object, my invention provides an improved hydraulic separator, in which the mixed gas is injected in puffs or pulsations, thereby forming bubbles in the water or liquid, as aforesaid. In this hydraulic separator the segregation of the gaseous mixture takes place.

As a further object, my invention provides an improved exhauster and blower, which is practically a pumping apparatus, and which is utilized as the blower for delivering the gaseous mixture under pressure, or forcing it through the instrumentality which causes the pulsations of the gaseous mixture; while a similar exhauster and blower, without the pulsating attachment, is also utilized for pumping liquid in the hydraulic separating apparatus.

In regard to the preliminary segregation of a gaseous mixture in which the component gases differ, to a certain extent, in their respective density it has been proven by experiment that the rapid, intermittent interruption of the passage of a mixture of gases through a confined space, such as a pipe or conduit, through which the mixed gas is forced under pressure, has a tendency to separate the mixture into its elemental constituents. This principle I have utilized, in one of the apparatuses comprised in this invention, in effecting a partial separation of the gases in order to reduce, when desired, the work to be done by the hydraulic separator.

In the final segregation of a gaseous mixture, I have made use of the principle that "when a gas is in contact with a liquid on which it has no chemical action, said gas is absorbed by the liquid in amount which is proportional to its particular solubility and to the pressure under which the gas is at the time of operation; and, in the case of a gaseous mixture, each gas is absorbed as if it alone was present, that is, as stated before, in proportion to its own particular solubility in the liquid in use, and to the pressure under which the gas is at the time of operation." But if the gaseous mixture to be separated is a mixture obtained from the production of water-gas, it should first preferably be passed through a suitable converter (not included in the present invention) in order to change the carbonic-oxid therein into carbon-dioxid or carbonic-acid gas, this being necessary in order that the said carbonic-oxid may be rendered in a condition in which it is dissolvable in water. The gaseous mixture is then passed through the apparatus for pumping or forcing it under pressure to the subsequent machines in the system, and to give it a series of pulsations as will hereinafter appear. This second apparatus may effect a partial separation of the gas by means of the before mentioned process of interrupting its progress.

The final step of separation of the gaseous mixture is performed by hydraulic action and the chemical dissolution of one of the component gases in the liquid, as previously mentioned. In this process, globules or bubbles of the gaseous mixture are introduced in a downwardly rushing column of liquid, by which they are carried down, the segregated or first component gas separating and collecting in a lower chamber, and the other component gas, which dissolves in the liquid, being carried off to a point where the pressure of the column of liquid behind is taken off, thus releasing the other component element in gaseous state.

The process carried on in the system of apparatus described has economy for its object. By my present method, large quantities of segregated gas can be pumped and stored for various uses with comparatively a small outlay, a thing much sought after, but heretofore impracticable and involving heavy expense. As is well known, water at ordinary pressure will dissolve its own volume of carbon-dioxid, and for each increased atmosphere of pressure will absorb another volume of such gas. It is also known that many substances, such for instance as lard, particularly if liquefied, absorb several times as much nitrogen gas as water. This fact I have taken advantage of in the present process.

Without limiting myself to the specific apparatus herein illustrated, which is susceptible of various modifications in details of construction and arrangement of parts, the invention will hereinafter be fully described with reference to the accompanying drawings which form a part of this specification, and then more particularly pointed out in the appended claims.

In said drawings.

Referring to Figs. 1 to 6 inclusive, the apparatus therein illustrated comprises what I term a blower and pulsator. Said blower and pulsator consists of three casings or sections $a$, $b$ and $c$, so fastened together as by bolting or riveting to intervening plates or partitions as to form three main chambers or compartments A, B and C, which communicate with one another in a manner to be hereinafter specified. The end plates and partitions between said chambers may be downwardly extended to constitute supports or legs for the machine. Extending centrally of the length of the machine, and journaled at both ends in bearings provided therefor, is a shaft D provided with a pulley $d$ by which motion may be transmitted to said shaft.

Figure 1:
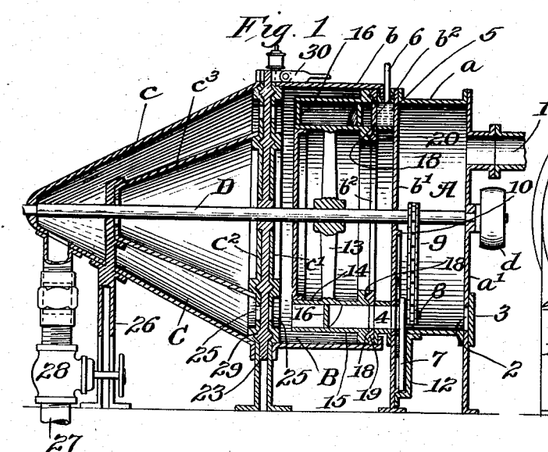
Figure 1 is a longitudinal central vertical section of the blower and pulsator.
Figure 2:
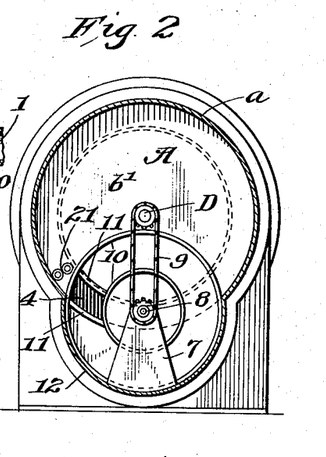
Fig. 2 is a vertical cross-section taken through the chamber A of Fig. 1.
Figure 3:
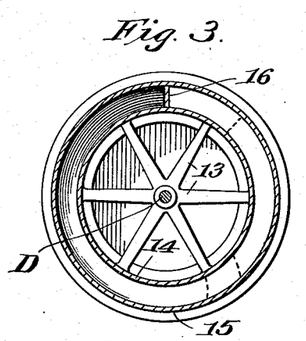
Fig. 3 is a vertical cross-section through the revolving drum of the exhauster and blower, shown in the chamber B of Fig. 1.
Figure 4:
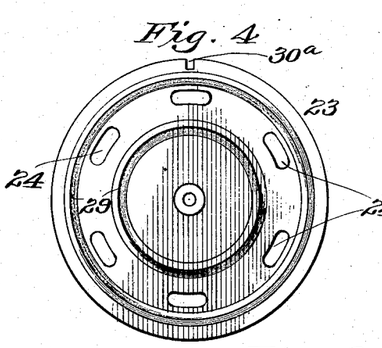
Fig. 4 is a face view of the disk 23 of Fig. 1.

The compartment or chamber A is desirably cylindrical in form and has for its end walls or partitions the plates $a'$ and $b'$. Said chamber or compartment is in communication with any suitable source, as a converter or generator, for supplying the mixture of carbon-dioxid and hydrogen, or other gaseous mixture which is to be separated; said mixture being admitted into the chamber A, for example, through the pipe or conduit 1. At its lower end, the chamber A is also shown provided with a hand-hole or opening 2, normally closed by a plate 3.

The gaseous mixture is pumped or exhausted from the chamber A into the chamber or compartment B, thus accumulating the said gaseous mixture under compression in said compartment B. From the latter compartment, the gaseous mixture is introduced with rapid intermissions into the chamber or compartment C, thus producing a series of pulsations or puffs in the gaseous mixture. From the chamber or compartment C, the said gaseous mixture, to which has been imparted the aforesaid pulsations, is conducted by a suitable pipe or conduit to the hydraulic apparatus for separating the hydrogen from the carbon-dioxid or the nitrogen from the carbon-dioxid, when treating exhaust gas, or any other suitable gaseous mixture.

Within the compartment or chamber B, mounted on the power-driven shaft D, is the blower, which at each revolution exhausts a volume of the gaseous mixture from the chamber A and forces it into the chamber B, and thence into the chamber C. Communication from the chamber A into the chamber B is afforded by a passage 4, opening at its one end through the plate or partition $b'$, and at its opposite end opening through an annular plate or partition $b^2$. Between the partition plate $b'$ and the adjacent plate $b^2$ is an annular oil-chamber 5, to which a supply of oil may be fed by a pipe 6. The passage 4, for conducting the gaseous mixture from chamber A to chamber B, extends through said annular oil-chamber, the purpose of which latter will presently appear. Inasmuch as the blower in chamber B at each revolution sucks in a volume of gas from chamber A and delivers it into chamber B, it is obvious that the chamber of the blower must be alternately in communication with chamber A and chamber B; and hence it is necessary that the passage 4 from chamber A to chamber B should be intermittently closed at the moment when the blower has completed the drawing in of its supply of gas, and while it is delivering such supply into the chamber B, preliminary to taking in another supply from chamber A. The intermittent closure of said passage 4 is performed by a revolving fan-like shutter 7, shown mounted on a stub or axle 8 extending from the partition plate $b'$, the shutter being driven from the main shaft D by a sprocket-chain 9, or any suitable gear. By reference to Fig. 2, it will be seen that at each revolution of the shaft, the shutter 7 passes over and closes for a brief interval the opening into the passage 4. In order to effect a tight closure of the passage 4, as the shutter 7 passes thereover, said shutter 7 preferably rides on concentric circular ribs or flanges 10 formed on the plate $b'$. These concentric flanges 10 bound the opening 4 at two opposite sides, and at the other two opposite sides said opening 4 is bounded by intervening or cross-ribs or flanges 11 of the same projection of the flanges 10. Hence, as the shutter 7 passes over the opening 9, it bears closely upon the flanges 10 and 11, thus effecting a perfect closure of said opening, and a cessation of the flow of the gaseous mixture from chamber A to chamber B; this cessation of communication between the two chambers being for only a small interval of the time of complete revolution of the main shaft D. Below the chamber A is a semi-circular or crescent-like housing 12, constituting an extension of the chamber A and housing the shutter during a part of its revolution.

Figures 5, 7, 8:
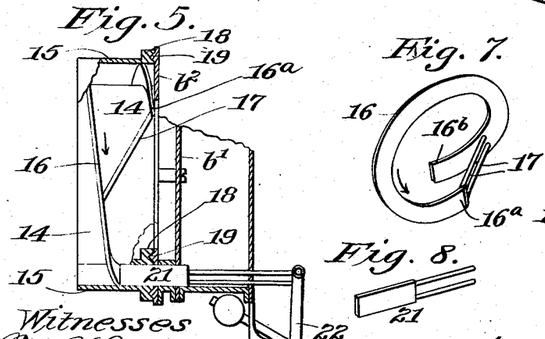
Fig. 5 is a fragmentary sectional view of the revolving fan blower.
Fig. 7 is a detail perspective view of the spiral rib or flange of the blower.
Fig. 8 is a detail perspective view of a reciprocating closure plate, constituting an element of the blower.
Figure 6:
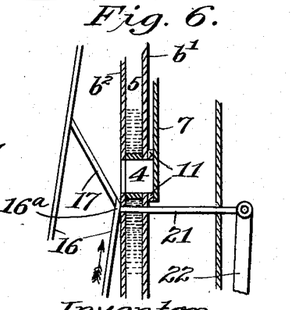
Fig. 6 is an enlarged detail sectional view of a part of the blower.

The exhauster and blower proper, or revolving pump member, whereby the gaseous mixture is pumped from the chamber A into the chamber B, is a wheel-like structure mounted upon the shaft D within the chamber B. Said structure may comprise a suitable hub with radiating arms or spokes 13, and concentric cylindrical shells 14 and 15, the inner shell 14 being fastened on the spokes, while the outer shell 15 is spaced from and connected to the inner shell by means of an intermediate spiral blade or flange 16, which is fastened to both of said shells. As shown in Figs. 6 and 7, the spiral blade or flange 16 comprises slightly more than a single convolution and its forward end $16^a$ (which end is the one nearer the chamber A) has extending therefrom two rods 17, extending obliquely to and connected with a point on the returning length of the flange. The concentric shells 14 and 15 have a close bearing on the annular plate $b^2$, and for this purpose said shells 14 and 15 are respectively formed with annular flanges 18 grooved for engagement with annular ribs 19 on the aforesaid plate $b^2$, and lubricant is preferably supplied to these annular bearings by ducts 20 from the annular oil-chamber 5, so as to insure a frictionless rotation of the shells 14 and 15 on the annular plate $b^2$. The forward end $16^a$ of the spiral-blade rides closely against the said annular plate $b^2$, as shown more clearly in Fig. 6 and from this forward end the aforesaid oblique rods 17 extend diagonally to the opposite or returning length of the blade. At one side of the passage 4, a sliding plate 21 extends through the annular oil-chamber 5, working in suitable bearings, and extends into the annular space between the concentric shells 14 and 15 of the blower. Said slide or plate 21, which is of the same width as the blade 16, is constantly pressed toward and bears against said spiral blade, as shown in Figs. 5 and 6. The pressure for forcing the slide against the blade may be imparted by weighted lever-arms 22.

The direction of revolution of the exhauster and blower is as indicated by the arrows in the drawings, the spiral flange 16 being thereby caused to revolve toward its forward end $16^a$, which end passes the spring-pressed slide or gate 21 before it passes over the passage 4. In other words, the aforesaid slide 21 is so located as to be behind the end $16^a$ of the spiral blade, and also behind the passage 4, after the said forward end $16^a$ of the blade has passed said passage 4. The operation of the said exhauster and blower, in conjunction with the said revoluble shutter 7, is as follows: It will be noted that the spiral blade 16 provides a spiral channel between said blade and the adjacent annular plate $b^2$, the front end of said channel being constituted by the meeting of the forward end $16^a$ of the plate against the plate $b^2$, while the rear end of the channel is closed by the slide or gate 21, as aforesaid. At each rotation of the shaft D the spiral blade 16 is caused to revolve with its inner forward end $16^a$ in close contact with the plate $b^2$. Assuming the parts to be in a relative position shown in Fig. 6, it will be observed that at this phase of the movement the revolving shutter 7 closes the opening or passage 4 so that no communication can be had at this time between the chamber A and the spiral channel between the blade 16 and plate $b^2$; and the forward end $16^a$ of the spiral blade is just about to approach the passage 4, the slide plate 21 of course pressing against the blade. In this position of the parts, the volume of gaseous mixture exhausted from the chamber A at the preceding revolution discharges into the chamber B, through the now open end of the spiral channel, which open end is crossed by the oblique rods 17. Now, when the forward end $16^a$ of the spiral blade 16 crosses the opening 4, the shutter 7 is displaced, and communication is established between the chamber A and the space formed between the spiral blade and the annular plate $b^2$, the back end of such space being closed by the slide plate 21. Such space, of course, constantly increases in capacity as the revolution continues, thus causing exhaustion or sucking of gaseous mixture from the chamber A. When the continued revolution of the spiral blade 16 brings the oblique rods 17 against the slide 21 (at which moment the shutter 7 again closes the passage 4) the gaseous mixture drawn from the chamber A can escape past the rods 17 and the outer end $16^b$ of the spiral blade into the chamber B, from whence it is forced by the continued storing of gas therein into the chamber C. This completes a cycle of movement of the blower, and of course the operation above described is repeated at each revolution of the shaft D.

As aforesaid pulsations are imparted to the gaseous fluid in passing from chamber B into chamber C, and the means for that purpose will now be described. Separating chamber B from chamber C is a double-walled partition, composed of two plates $c'$, $c^2$, between which is snugly but revolubly mounted a disk 23 rigidly-keyed on the shaft D. In said disk 23 is an annular series of segmental slots or openings 24 preferably so placed that the spaces between the slots or openings are longer than the openings, which latter are adapted to register at intermittent periods during the revolutions of the disk with similar slots or openings 25 in the partition-plates $c'$ and $c^2$. These slots or openings, which cause the rapid intermittent interruption of the forced discharge of the gaseous mixture from the chamber B, thereby give a series of puffs or pulsations to the gas. The slots or openings may be of any suitable number, though I have found six openings to give satisfactory results in this apparatus. The compartment or chamber C is formed by the annular space between the conical casing $c$ and an inside cone $c^3$, both of which cones are suitably fastened to the partition $c^2$, and are also provided with a suitable support or standard 26. The conical chamber C between the said cones $c$, $c^3$, confronts the slots or openings 24, 25 in the double-walled partition $c'$, $c^2$, and said chamber is of sufficient capacity to receive the mixed gases delivered from the chamber B through the pulsating disk 23, and allow their being conducted therefrom by the discharge pipe or conduit 27, which latter is provided with a cock or valve 28. The effect of these pulsations is to deliver the gaseous mixture to the hydraulic separator in a condition more readily adapted for forming bubbles, as previously explained. Within and without the circle of the segmental slots or openings 24, the disk 23 is provided on either side with concentric annular ribs or flanges 29 which bear in corresponding grooves in the partitions $c'$ and $c^2$, thereby aiding in rendering a snug joint to prevent leakage of gas, and to provide firm bearings of the disk, with the necessary lubricant to insure perfect working of said disk in its bearings.

As an incidental feature of the apparatus, the disk 23 is or may be keyed to the shaft D as to be easily released, so that if it is desired to use the apparatus merely as an exhauster and blower, without the puffing or pulsating effects, the disk can be released from its rigid connection with the shaft D and held stationary by means of a latch or lever 30, shown attached to the top of the casing, which latch or lever can be dropped into a notch $30^a$ (Fig. 4) in the periphery of the disk, thereby bringing the openings in said disk and in the partition-plates into registration.

It may be well to summarize the operation of the blower and pulsator as follows: In operation, the gaseous mixture is admitted to the apparatus from a generator or converter (not shown), or from any suitable source of supply, by means of the pipe or conduit 1. being first introduced into chamber A. Power transmitted to the shaft D by any suitable means revolves at their proper speeds the shutter 7, the blower (comprising concentric shells 14, 15 and spiral blade 16), and the pulsator disk 23. The shutter 7 as it revolves closes the passage or opening 4 for a short period in each revolution. At each of these periods the relative positions of the shutter 7 and spiral blade 16 is as indicated in Fig. 6. That is, when the shutter 7 closes the opening, the forward end 16ª of the spiral blade or flange 16, bearing against plate $b^2$, is just approaching the opening or port 4, beside which the reciprocating slide 21 operates, forcing said slide to the outward limit of its travel. As the shutter 7 moves from over the port 4, the spiral-blade revolves in the direction of the arrow, as indicated in Fig. 6, thereby carrying the forward end of the spiral flange beyond the said port, and admitting a supply of gas or gaseous mixture between said end and the reciprocating slide 21, which continually keeps its rear end in contact with the said spiral flange through the pressure exerted by the weighted levers 22, so that the size of the inclosed space thus made is constantly increasing, causing exhaust of gas from the chamber A. When the drum and spiral have revolved until the slide 21 begins to travel over the oblique rods 17, the shutter 7 again closes the opening 4 to avoid any back-pressure of the gas held in the spiral channel, said gas being allowed to escape between the guides or rods 17 into the chamber B. The above described operation completes one cycle of movement of the blower drum and shutter; the rapid repetition of this operation causes an exhaust of the gas from the chamber A into chamber B, and against the pulsator-disk 23. As heretofore explained, the gaseous mixture is discharged or blown from chamber C through the slots or elongated openings 25, 24 in the partitions $c'$ and $c^2$ and in the disk 23, as the two series of openings come into registration, in the course of the revolutions of the disk. The gas is thereby given a rapid series of pulsations as it passes through the chamber C and out by way of the outlet-pipe 27 into the next apparatus.

Figure 9:
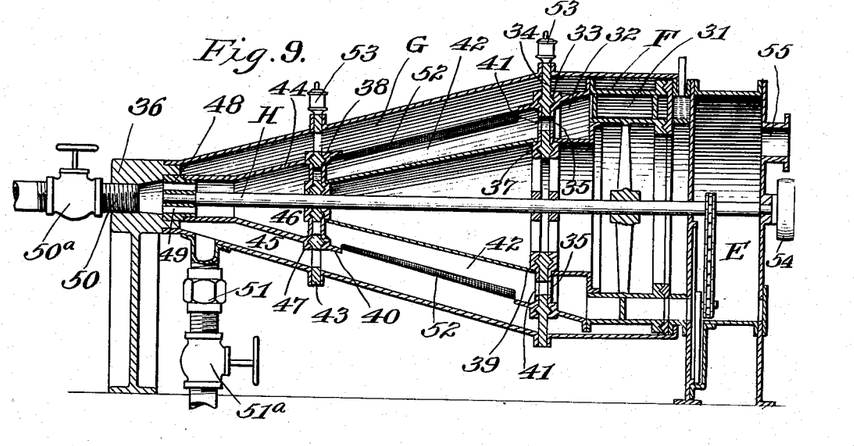
Fig. 9 is a central vertical section of another form of blower and pulsator, embodying therein means for effecting a preliminary partial separation of the gaseous mixture by the mechanical action of pulsations and interruptions.

In Figs. 9 to 12 inclusive, I have illustrated another form of blower and pulsator, which apparatus includes means for effecting a partial separation of the gaseous mixture into its constituent elements by the mechanical action by the pulsations imparted to the gas and also interruptions of the flow of the gas. In other words, the function of this apparatus is to blow the gaseous mixture and impart the desired pulsations thereto, like the apparatus shown in Fig. 1, and also to make an initial separation of the gaseous mixture. This partially separated gaseous mixture is then delivered by the outlet pipe into the next apparatus of the system, that is the hydraulic separator which finally effects the separation of the gaseous mixture. Referring more particularly to Fig. 9, the apparatus is substantially similar in general construction and operation to that already described with reference to Fig. 1, except in the particulars hereinafter mentioned. Said apparatus is composed of three chambers E, F and G, whose general arrangement and conformation are similar to that of the exhauster and pulsator heretofore described. Chamber E is or may be identical in construction and operation with chamber A disclosed in Fig. 1. It contains the shutter 7 for intermittently closing the passage 4 into chamber F. Chamber F, with its internal arrangements, is similar to chamber B of Fig. 1 with the following exceptions, namely, the revolving exhauster and blower drum 31, while substantially the same as in Fig. 1, has rigidly fastened at its rear side, by means of solid flanges, an annular chamber 32, which chamber is in reality an enlarged-extension of the spiral chamber formed by the concentric shells of the drum. The opposite end of said annular chamber 32 is fastened to and closed by a disk or plate 33, which is keyed on the central driving shaft H, and bears against a stationary plate or disk 34, which forms a partition between the chambers F and G. The said rotary disk 33 has, leading out from the annular chamber 32, an annular series of slots or openings 35, which form outlets for the passage of the gas, and register with or confront at intervals during the revolutions of said disk a similar series of holes in the stationary partition-plate 34, as in the case of the series of slots or openings described with reference to the apparatus shown in Fig. 1. The chamber G is conical in form, and is socketed at its smaller end in a standard 36, said standard also carrying the bearing for one end of the shaft H.

Mounted on the shaft H, by means of disks or plates 37 and 38, are two inter-arranged or concentric shells 39 and 40 of frusto-conical shape, said shells 39 and 40 being mounted so as to leave an annular space or chamber between them. The disk 37, which supports the larger ends of the shells 39 and 40, is of a similar construction to the disk 33; it may be rigidly affixed to the stationary partition-plate 34, and is provided with a series of segmental slots or openings 41 which register with the ports or openings in the partition-plate 34; so that there will be a communication between chambers 32 and 42 when the segmental slots 41 in the rotary disk 33 register with the slots in the stationary partition-plate 34 and disk 37. At the opposite or smaller ends of the cones 39 and 40, their supporting disk 38 is affixed to a smaller stationary partition-plate or disk 43, which is mounted near the middle of the conical chamber G. Said stationary plate 43 and disk 38 are also provided with registering segmental holes or openings, similar to those in the disks 33 and 37 and in the partition-plate 34. On the opposite side of the plate 43, the conical chamber G is subdivided by means of a tapering or conical shell 44 into two concentric subchambers 45 and 46, the outer one 45 of which forms practically an extension of the main chamber G, communicating therewith by means of openings or ports in the plate 43; while the inner subchamber 46 communicates with the interior of the revolving frusto-conical chamber 42 through the periodically-arrested passages provided by the slots or openings in the partition-plate 43 and disks 38, 47. The said subdividing cone 44, which is revoluble, is supported at its larger end by the disk 47, the latter being keyed on shaft H and bearing against the partition-plate 43; while at its smaller end said conical shell 44 is journaled on the shaft-bearing 48. Through apertures 49 in said bearing 48, the gases in the subchamber 46 may be conducted to an outlet-pipe 50. Gases introduced from chamber 42 into the subchamber 45 are led off by means of a pipe 51, shown provided with a cock or valve 51ª. The holes in the disk 47 and plate 43, respectively, bear such relation to those in the larger disks 33 and bearing-plate 34, with regard to their relative times of registration, that when the series of openings at the larger end of the frusto-conical shells 39 and 40 are in registration, the series of openings at the opposite or smaller end of said shells are not in registration, and vice-versa.

Figure 10:
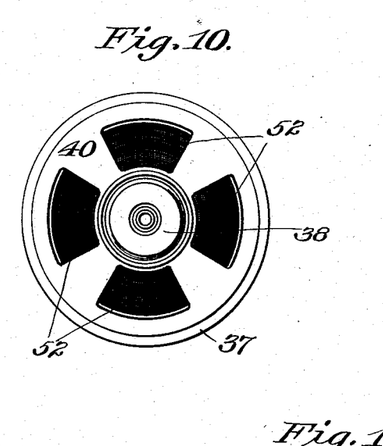
Fig. 10 is an end view of a conical drum contained in the apparatus shown in Fig. 9.
Figure 11:
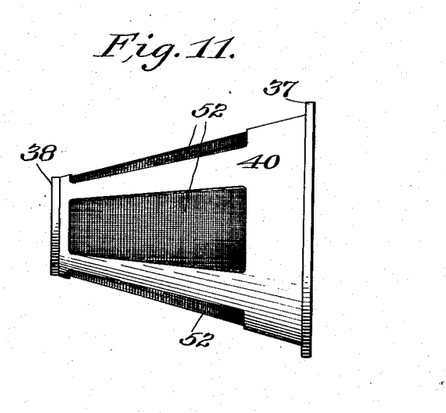
Fig. 11 is a side elevation of said conical drum.
Figure 12:
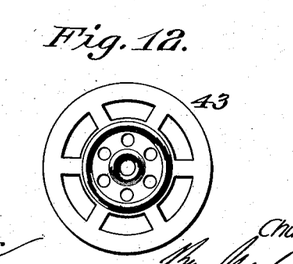
Fig. 12 is a front elevation of a detail part.

As shown in Figs. 9, 10, 11, large sections of the frusto-conical shell 40 are cut away, said sections being replaced by curved screens of porous material 52, adapted to allow the passage therethrough of lighter gas under pressure. While the above mentioned porous material may be of any suitable composition, I have found a satisfactory and preferable composition to be composed of porcelain and pulverized asbestos. Thus when a gaseous mixture is periodically injected into the frusto-conical shell 40, this action will precipitate said gas against the sides of said shell and consequently against the porous screens 52, through which the lighter gas of the mixture will be filtered, while the heavier gas is retained in said shell and disposed of through the openings in the disks 38, 47 and intervening plate 43. The discharge outlets 50 and 51 for the separated gases are provided with suitable cocks or valves 50ª and 51ª for cutting off the apparatus from the succeeding parts of the system. Oil cups 53 may be provided for the proper lubrication of the various bearings. The operation of this apparatus (Fig. 9) is as follows: After the machine is set in motion by power applied to the pulley on shaft H, a gaseous mixture admitted at inlet port 55 into chamber E is exhausted from said chamber E by the revolving exhauster and blower 31, as in the apparatus shown in Fig. 1. By the action of the exhauster and blower 31, the gas is projected by way of the annular chamber 32 through the intermittently opened ports into the chamber 42 of the frusto-conical shell 40, thus receiving a series of puffs or pulsations. It will be remembered, however, that at the instants at which the ports 35 of disk 33 are opened to introduce gas into the chamber 42, the openings in the disks 47 at the opposite end are closed, so that as the gas is receiving a series of rapid pushes from behind, it is also receiving a corresponding series of interruptions from ahead. The consequence of these interruptions is to cause a partial separation of the gases by reason of the different specific gravities of the constituent gases, and to give to the subsequent passage of the partially separated elements a jerky movement. Through the porous screens 52 the lighter gas, together with a certain small percentage of the heavier gas, is filtered, to be conducted off through chamber G and subchamber 45 to outlet pipe 51, to be supplied to the hydraulic separating apparatus; while, for instance, the carbonic-acid gas, containing a certain small percentage of hydrogen, is issued from the rotating chamber 42 through the intermittently registering apertures in disks 38, 47 and plate 43 to the annular subchamber 46, where it is carried off by means of the outlet pipe 50 to be allowed to escape or to be utilized for any desired purpose.

From the foregoing, it will be noted that the apparatus shown in Fig. 1 makes no preliminary separation of the gaseous mixture, but delivers the unseparated mixtures in puffs or pulsations, while the apparatus shown in Fig. 9 effects a preliminary withdrawal of a portion of the heavier gas and delivers the partially purified lighter gas, but still containing some of the heavier gas, this being also delivered in puffs or pulsations. In both cases the gas to be purified is, under the pressure of the blower, and under the effects of the pulsations imparted thereto, delivered to the hydraulic separating apparatus which performs the final step of the process. This apparatus (Fig. 13) comprises a separating-tank, wherein the gaseous mixture is introduced into the liquid which separates it into its elements; a liquid-reservoir in which the segregated gas collects prior to being conducted to a suitable storage receptacle, and which also holds a reserve supply of liquid, which is used repeatedly in the process of gas-separation; and a pumping apparatus which keeps the liquid in motion through the apparatus and under pressure at the same time.

Figures 13, 14:
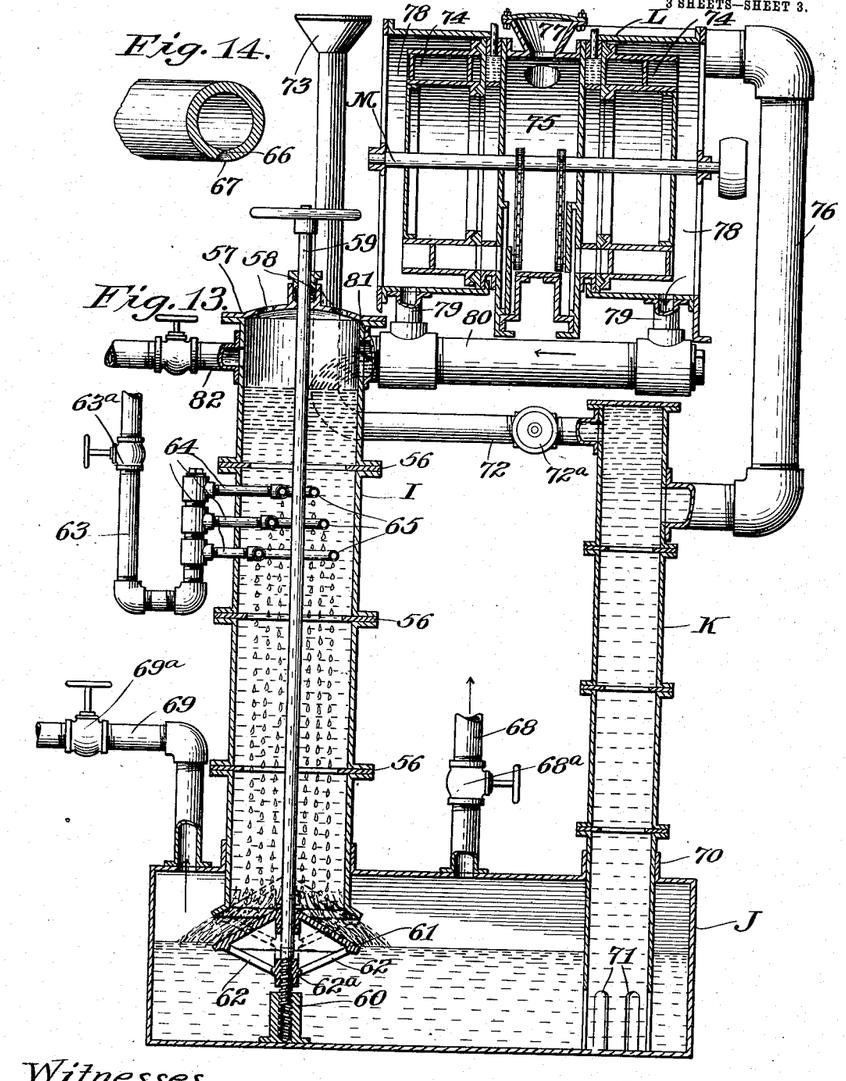
Fig. 13 is a vertical sectional view of the hydraulic apparatus for segregating the component elements of the gaseous mixture by means of the dissolution of one of the component elements in a suitable liquid.
Fig. 14 is a detail view of a section of the perforated pipe from which the gaseous mixture is injected into the water, producing bubbles.

Referring to Fig. 13, the letter I denotes the separating tank, in the form of a stand-pipe erected upon and communicating with a reservoir J. Said stand-pipe or separating tank I is shown constructed of a number of flanged sections, bolted together, with interposed metallic gaskets 56. The said gaskets 56 are constructed with their inner diameters smaller than the regular diameter of the stand-pipe sections, so that a certain amount of the liquid in the stand-pipe will be stopped by the inwardly projecting gaskets 56 and form liquid cushions, against which the downwardly flowing column of liquid, which is pumped into the top of said stand-pipe, will be directed centrally rather than entirely against the sides of the stand-pipe, thus reducing frictional effects, to the advantage of the flowing speed of the liquid and consequently its separating power. The top of said stand-pipe I is closed by a cap 57, provided with air-vents 58, and which also affords a bearing for a vertical shaft 59. Said shaft 59 carries a hand-wheel at its upper end, and is provided with a screw-threaded lower end working in a fixed female screw for the purpose of adjusting or raising and lowering said shaft by turning said hand-wheel. The said shaft 59 carries adjacent to the bottom of the stand-pipe a closing valve 61, adapted to close the bottom of said stand-pipe when the apparatus is to be stopped. Said valve 61 is shown in the form of a conical cap, which is fitted by means of a collar on the shaft 59, and is provided with brace rods 62 which extend obliquely downward from the periphery of the cone to another collar 62ª fastened on the shaft 59. The conical shape of the valve adapts it to more effectually break and scatter the liquid on its descent, thus allowing the segregated gas to more easily escape from the liquid. The gaseous mixture, delivered under force from the blower and pulsator, is fed into the liquid in the stand-pipe from a supply pipe or conduit 63, having a series of branch-pipes 64 which pierce the sides of the stand-pipe near its top, but below the water-level, and terminate in annular tubes 65, which preferably increase in diameter from the topmost to the lowermost tube. The lower sides of said annular tubes 65 are provided with numerous small outlet ports or orifices 66 (see Fig. 14) which are enlarged at the outer surfaces of the tubes into cup-like depressions 67. These cup-like depressions 67 are adapted to promote or facilitate the formation of the gas into bubbles or globules.

The reservoir J, upon which the stand-pipe I is mounted with a short section, the latter projecting into said reservoir, is a large tank, preferably of comparatively large horizontal area and a small depth. Rising from said tank are outlet pipes 68 and 69, which are provided with cocks or controlling valves 68ª and 69ª. The pipe 68 is to permit escape of air when the apparatus is first set in operation. The other pipe 69 conducts off the segregated gas which collects in the top of the reservoir J above the water level. Said tank J is further provided with an upright conduit or pipe K, which extends through a flanged opening 70 in the top to the bottom of the reservoir J, where it is provided with openings 71 through which the liquid is passed from the reservoir J. Said conduit K is provided near its top with a starting pipe 72 extending vertically upward and terminating in a funnel 73, to receive the liquid to fill the apparatus for starting. A cock or valve 72ª in the pipe 72 provides for cutting off communication. Said conduit K is smaller than the stand-pipe I and is preferably built up of several flanged sections, similar to those used in constructing the stand-pipe, the bolted joints being also provided with the inwardly projecting gaskets hereinbefore described. The conduit K is further provided near its head with a pipe 76, whose purpose is to convey the liquid from the conduit to the pumping apparatus L. The function of the pump is to keep the liquid in constant circulation through the apparatus, introducing it at the head of the stand-pipe I and exhausting it through conduit K. Said pumping apparatus L is constructed as a combination of two exhauster-and-blowers of the kind shown in Fig. 1, being adapted in this instance, however, to pump liquid instead of a gaseous mixture. There is a medial chamber 75, common to the two pumps or blowers. Into this chamber 75, the pipe 76 empties. Said chamber 75 is also provided with a funnel 77 for initially filling the apparatus; said funnel being provided with a cap or closure. At opposite sides of said chamber 75 are pump-chambers 78, 78, each containing a rotary pump-drum 74 of the character described with reference to Fig. 1, each having concentric shells with intervening spiral flange or blade, operating in conjunction with the same revolving shutter, slide-plate, etc., already fully described; said pump-drums being mounted on a drive-shaft M. The liquid after being pumped from the common chamber 75 into the opposite chambers 78, 78 is ejected by way of outlets 79, 79 and feed-pipe 80 into the upper end of the stand-pipe I. A damper or valve 81 provides for cutting off communication between the stand-pipe I and the pumping apparatus L.

The hydraulic apparatus as a whole is started and operated as follows: The valves 68ª and 69ª in the outlets 68 and 69 of the tank J are closed, communication between the stand-pipe I and pumps L is cut off, and the valve 61 at the foot of the stand-pipe is screwed up by means of the hand-wheel on shaft 59, closing the bottom of said stand-pipe. The stand-pipe is then filled with liquid through the top 57, and the tank J and pipe K are supplied with liquid through the feed pipe 72. The pumping apparatus L is also supplied with liquid or "primed" through the funnel 77. As liquid is introduced into the tank J, through the openings 71 in the bottom of the pipe K, the air contained in said tank collects at the top, thus maintaining a certain initial pressure before the apparatus is started. The apparatus is now in a condition to be started. The valve 81 is opened and the pumping apparatus L started, so that liquid is pumped from the pipe K and tank J into the stand-pipe I. The conical valve 61 is then lowered, opening the bottom of the stand-pipe I, so that the column of liquid contained in the stand-pipe descends into the tank J, and, as a continuous supply of liquid is being fed into the top of said stand-pipe, a constantly falling column is maintained; the same liquid being utilized repeatedly, making a circuit through the apparatus. After the liquid has begun to regularly flow or fall through the stand-pipe, the valve $68^a$ is temporarily opened to allow escape of air from the tank J, the air being replaced by the collection of the segregated gas. When the latter collects in sufficient volume, the valve in the gas-outlet pipe 69 is opened, the valve in the air-escape pipe 68 now being closed.

It will be remembered that the gaseous mixture pumped from the blower and pulsator has imparted thereto a series of rapid puffs or pulsations; consequently, as the gas is injected into the liquid, from the small ports or orifices 66, it forms in numerous bubbles. These bubbles are carried downward by the rapid descent of said column of liquid, during which one of the component elements of the gaseous mixture becomes dissolved and absorbed by the liquid, freeing the other component element of the gaseous mixture, which remaining in the liquid as free bubbles of the segregated gas are still carried along thereby until the column of liquid is broken by the conical valve 61, when the bubbles of the segregated gas are allowed to escape and collect in the upper part of tank or reservoir J in a compressed state, since it is evident that a gas taken hold of by a column of descending liquid, and carried downward thereby will be subjected to the constantly increasing compression afforded by the column of liquid behind it. When a sufficient volume of the segregated gas has been compressed and stored in the tank J to maintain the pressure exerted by the air which was initially held therein, the said air is allowed to escape by opening the valve $68^a$ in the outlet-pipe 68 long enough to get rid of all such air, whereupon said valve is again closed, and the valve $69^a$ in outlet pipe 69 is opened to allow the segregated gas to flow into a storage tank therefor as it is separated from the other component element of the gaseous mixture. The component element, which remains dissolved as long as pressure is exerted on the liquid in the tank J, and while it is being again pumped through the exhauster L, is allowed to escape as said pressure is removed as the liquid issues again into the top of stand-pipe I. Here the dissolved component gas is freed from the liquid and allowed to escape into the atmosphere through the vents 58, or provision may be made to store said gas for any use to which it may be adapted, by carrying it out through pipe 82. By repeating the operation several times, that is passing the gas mixture issuing out of the reservoir J through outlet pipe 69, in the blower and pulsator, and injecting it anew into the falling column of liquid in the hydraulic compressor, a mixture containing 75 per cent., or more, oxygen, if treating atmospheric air, or 75 per cent., or more, $CO$, if treating producer gas or blast furnace gas, could be obtained with the same apparatus, each operation depriving the gaseous mixture of part of the remaining nitrogen gas.

It is noted that the hydraulic apparatus of Fig. 13 constitutes also a gas compressor; the globules of gas being sucked down by the downwardly-flowing liquid-column in the stand-pipe I, and escaping or separating from the liquid in the subjacent tank J and collecting in the top of said tank under the pressure of the liquid column; so that the supply of segregated gas is stored under compression. The segregated gas, which is produced by this method is also valuable for its coolness and dryness, since the compression of said gas has the effect of extracting therefrom all undesirable moisture, and does not send off the gas in a heated condition as in the case of ordinary generators or producers.

It will be understood that the apparatus may be used for the segregation of many gaseous mixtures. It also has a further utility as an apparatus for supplying a gas under pressure, as, for example, to supply compressed air for any suitable motor, or elastic fluid turbine. To illustrate this utility of the apparatus, assume that the blower and pulsator feed in or to the hydraulic compressing apparatus, the air being thus supplied under force or pressure and having the aforesaid pulsations imparted thereto, which facilitates the formation of the air into bubbles or globules as it is sucked down by the downwardly flowing column of water in the stand-pipe I. It is understood from the foregoing that the globules of air will be drawn down by the falling column of water and will separate from the water in the tank J and collect in the top of said tank, thus being subjected to the pressure of the water column. The air or other gas in the tank might then be conducted through a heater so that the apparatus will supply compressed air in a heated state for driving a turbine, or for other purposes.

The embodiment of the invention shown is only one of many which would lie within the scope of this invention and hence the claims are not limited to the specific details of arrangement and construction illustrated.

It should be understood that the dissolved gas, for instance, the carbon-dioxid released from the water as it flows into the stand-pipe may be collected for various purposes, as by conducting it off through a pipe 82. In this connection, as a further utility of the apparatus, the same may be applied to recovering a large percentage of the $CO_2$ contained in the gases of an internal combustion engine, which gases are ordinarily wasted. In this case, the exhaust gases from the combustion engine, consisting of a mixture of carbon-dioxid and nitrogen, are treated in the same manner already fully described, thus separating and collecting the nitrogen in the top of the tank J. The carbonic-acid gas or carbon-dioxid, being conducted off from the top of the stand-pipe I, may be passed through or over the glowing fuel bed of a gas producer employed for supplying gas to the gas-engine. As the carbon-dioxid passes through the fuel bed it is converted into carbonic-oxid, thus enriching the gas produced by the producer and being carried back to the gas-engine.

Having thus fully described my invention, what I claim as new and desire to secure by Letters Patent of the United States is:

1. In an apparatus for segregating mixed gases, the combination of means for supplying the gaseous mixture under force or pressure, imparting rapid pulsations thereto, and delivering or injecting the gaseous mixture into water or other liquid adapted to effect segregation of the constituent gases.

2. In an apparatus of the character described, the combination of a hydraulic compressing apparatus having a downwardly-flowing liquid-column adapted to suck down globules of gas introduced thereinto and having a gas-collecting chamber at the bottom of said column in which the gas escaping from the liquid collects, a feed-conduit or conduits for introducing the gas into the said downwardly-flowing column, and means for supplying the gas under force or pressure, and means for imparting rapid intermittent pulsations to the gas, causing it to issue in puffs into said liquid-column.

3. In an apparatus for segregating mixed gases the combination of means for supplying a gaseous mixture, a hydraulic-apparatus containing liquid under pressure adapted, when the gaseous mixture is injected thereinto, to dissolve the other constituent part of the gas and leave the segregated gas, means for collecting the segregated gas, and means for supplying the gaseous mixture under force or pressure and injecting it into said liquid, and means for imparting rapid pulsations to the gas as it is forced into the liquid.

4. In an apparatus of the character described, the combination of a hydraulic compressing apparatus having a downwardly-flowing liquid-column adapted to suck down globules of gas introduced thereinto and having a gas-collecting chamber at the bottom of said column in which the gas escaping from the liquid collects, a gas-feed-pipe having a multiplicity of discharge orifices into the liquid column, means for supplying gas under force or pressure in said pipe, and means for rapidly intermittently interrupting the flow of gas.

5. The combination of a blower and pulsator, wherein the blower forces a supply of gas through the pulsator, which latter rapidly interrupts the flow of gas intermittently, whereby a rapid series of pulsations are exerted on the gas, and a hydraulic apparatus containing a downwardly-flowing liquid column into which the gas is introduced from the pulsator.

6. A combined blower and pulsator comprising a blower-chamber and an adjacent chamber into which the gas is pumped or forced from the blower-chamber, communicating opening or openings between said chambers and means alternately opening and closing such communication with rapid intermission, and a gas-pump or blower in said blower-chamber for forcing the gas from a suitable source of supply into said adjacent chamber.

7. A combined blower and pulsator comprising a blower-chamber and an adjacent chamber into which the gas is pumped or forced from the blower-chamber, communicating opening or openings between said chambers and means alternately opening and closing such communication with rapid intermission, said means comprising a partition disk or plate between said chambers and an adjacent disk, one being revoluble with respect to the other, said disks having series of ports which register intermittently during the revolution, and a gas-pump or blower in said blower chamber for forcing the gas from a suitable source of supply into said adjacent chamber.

8. A combined blower and pulsator comprising a blower-chamber and an adjacent chamber into which gas is forced from the blower-chamber, said adjacent chamber having an outlet conduit for delivering the gas, communicating opening or openings between said chambers and means alternately opening and closing such communication in rapid intermission, means in said adjacent chamber for intermittently interrupting the flow of gas therein at the intervals of communication between the two chambers, and a gas-pump or blower in said blower chamber for forcing the gas from a suitable source of supply into said adjacent chamber.

9. The combination of a blower-chamber having a gas-inlet port or passage from a source of gas-supply, or from an exhaustion-chamber in communication with such source of supply, a revolving drum in said blower-chamber comprising concentric shells and an intermediate spiral-blade, said shell rotating in the direction of the front end of said blade nearest said gas-inlet port, which end as well as the front ends of said shells bear against the wall of said blower-chamber in which the gas-inlet port is provided, a slide entering said wall and between said concentric shells and yieldingly bearing against said spiral blade, said slide being so positioned that it is approached by the front end of the spiral blade in advance of the gas-inlet port, means for automatically pushing back said slide when the return convolution of the spiral blade reaches it, and means for intermittently closing said gas-inlet port during the period when the slide is pushed back and at least until it again bears against the spiral blade.

10. The combination with means for feeding gas, of a hydraulic apparatus comprising a tank, a stand-pipe rising therefrom, a pumping apparatus connected with said tank and adapted for pumping liquid therefrom into the top of said stand-pipe, thus maintaining a constant falling column of liquid in said stand-pipe and a circuitous flow of liquid through the stand-pipe, tank and pumping apparatus, means for injecting the gas into said stand-pipe, and means for conducting off gas which collects under pressure of the liquid-column in the top of the tank.

11. The combination of means for supplying under force or pressure a gaseous mixture containing suitable constituent gas, a hydraulic apparatus having a falling liquid column into which the gaseous mixture is injected and sucked down by the falling liquid column, whereby one of the component elements of the gaseous mixture becomes dissolved in the liquid, freeing the other constituent gas, and means for liberating and collecting the segregated gas from the liquid.

In testimony whereof I affix my signature, in presence of two witnesses.

CHARLES J. A. FIESSE.

Witnesses:
 OSGOOD H. DOWELL,
 EDWARD R. WITMAN.